Figure 1:
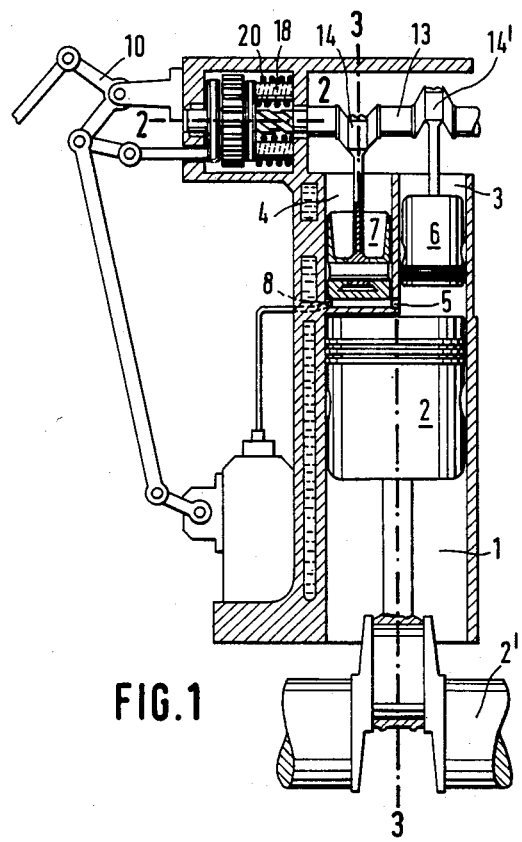

United States Patent [19]

Van Avermaete

[11] Patent Number: 4,625,684
[45] Date of Patent: Dec. 2, 1986

[54] INTERNAL COMBUSTION ENGINE

[76] Inventor: Gilbert L. Ch. H. L. Van Avermaete, 2 Um Bourbierg, Hellange 3335, Luxembourg

[21] Appl. No.: 642,127
[22] PCT Filed: Dec. 28, 1983
[86] PCT No.: PCT/BE83/00024
§ 371 Date: Aug. 30, 1984
§ 102(e) Date: Aug. 30, 1984
[87] PCT Pub. No.: WO84/02745
PCT Pub. Date: Jul. 19, 1984

[30] Foreign Application Priority Data

Jan. 4, 1983 [LU] Luxembourg .................... 84574

[51] Int. Cl.⁴ ............................................ F02B 75/04
[52] U.S. Cl. .................. 123/48 A; 123/48 D; 123/78 A; 123/78 D
[58] Field of Search .............. 123/78 R, 78 A, 78 D, 123/78 AA, 48 R, 48 A, 48 D, 48 AA, 51 R, 51 B, 51 BA

[56] References Cited

U.S. PATENT DOCUMENTS

| 1,435,777 | 11/1922 | Williams | 123/48 A |
| 1,489,004 | 4/1924 | Powell | 123/78 AA |
| 1,754,410 | 4/1930 | Allwill | 123/78 A |
| 2,563,885 | 8/1951 | Tatter | 123/78 A |
| 3,741,175 | 6/1973 | Rouger | 123/48 A |

FOREIGN PATENT DOCUMENTS

| 1207573 | 2/1960 | France | 123/48 AA |
| 370881 | 5/1939 | Italy | 123/51 BA |
| 7808110 | 2/1980 | Netherlands | 123/78 D |
| 396794 | 8/1933 | United Kingdom | 123/78 D |

Primary Examiner—Craig R. Feinberg
Attorney, Agent, or Firm—Martin A. Farber

[57] ABSTRACT

Internal combustion engine comprising at least one cylinder (10), one piston (2) mounted to the crankshaft (2'), and at least one inlet valve and one exhaust valve. At the end of the cylinder (1) corresponding to the top dead center of the piston (2) are arranged on one hand a second cylinder (3) and a second piston (6) which are integral parts of the cylinder (1) and on the other hand a third cylinder (4) and a third piston (7) wherein injection means (8) and ignition means (9) are provided, the cylinder (4) communicating by a conduit (5) with the cylinders (1) and (3). The coupler means (11) provide for the drive of a small crankshaft (13). The control (10) enables via the coupler (11) a rotation angle shift up to 180° between the shaft of the crankshaft (2') of the cylinder (1) and the shaft of the small crankshaft (13), the latter having two throws (14) and (14') offset by 180° and actuating the pistons (6) and (7). The piston (7) delimits the combusting chamber of the cylinder (4) in synchronization with the top dead center of the piston (2) of the cylinder (1), in the compression end phase, as well as the flow rate of the injection pump so as to obtain the combustion of a portion of the freely admitted fluid into the cylinders (1) and (3) with a constant pressure compression ratio.

4 Claims, 3 Drawing Figures

INTERNAL COMBUSTION ENGINE

The present invention relates to internal combustion engines with a variable auxiliary chamber and its object is to provide an engine in which the chamber for compression of the fluid producing movement of the piston in the cylinder of the engine has a variable volume with a constant compression ratio so that the volumetric ratios may vary in accordance with the different running states of the engine and it may be possible to put under combustion a large or small part of the combustive fluid introduced into the expansion chamber of the engine.

The object is achieved according to the invention by the fact that the engine is characterised in that it comprises, close to that end of the cylinder which corresponds to the upper dead point of the piston, a second and a third cylinder, the second cylinder forming an integral part of the first cylinder while the third cylinder communicates with the first cylinder by a conduit, either directly or by way of the second cylinder, a piston being provided in both the second and the third cylinder to delimit two chambers in these cylinders.

According to the invention, the pistons of the second and the third cylinder are subjected to an alternating movement by means of crank pins set at an angle of 180° from each other on the shaft of a small crank forming with the cam shaft a kinematic chain in which the casing of the clutch is situated.

Also according to the invention, in the clutch casing, the transmission inlet gearing is driven by the cam shaft without being locked thereto but is connected thereto by spiral grooves on the shaft and, situated in the same plane, the output gearing driven by the input gearing provides for the transmission of the shaft of the small crank without being locked thereto and is also connected to the latter by spiral grooves.

Figure 3:
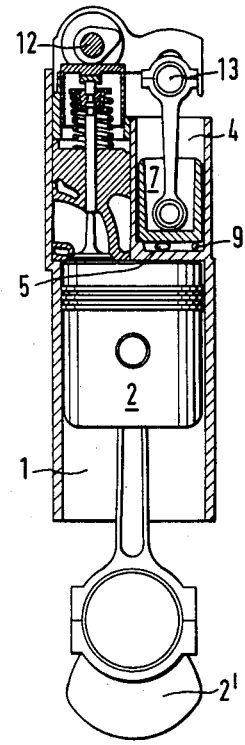
Figure 2:
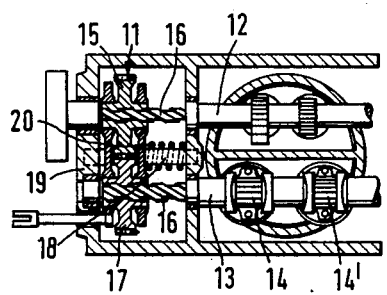

For a better understanding of the invention, the latter is now described in more detail on the basis of the annexed schematic drawing given solely by way of example, showing in:

FIG. 1 a partial longitudinal section through an engine according to the invention; and in FIGS. 2 and 3 a section, respectively, through the lines 2—2 and 3—3 of FIG. 1.

The drawing shows an internal combustion engine having a cylinder 1. Arranged in the cylinder in a position close to the end of the cylinder corresponding to the upper dead point of the piston 2 are a second cylinder 3 forming an integral part of the first cylinder 1 and a third cylinder 4 partitioned off from the other cylinders but communicating by a duct with the first cylinder 1 either directly or, as shown indirectly via opening 5 of FIG. 1, by way of the second cylinder.

In each of the cylinders 3 and 4 there is mounted a piston 6 and 7, respectively, and in the third cylinder 4 there are provided injection means 8 and means 9 for igniting the mixture.

The distribution of air compressed by the first cylinder 1 into cylinder 4, the combustion cylinder, and cylinder 3, the air reserve cylinder, can be adjusted by means of the throttle 10 according to the desired motor torque.

According to the invention, the clutch casing 11 is situated in the kinematic chain between the cam shaft 12 and the small crankshaft 13 which has two crank pins 14,14′ set at an angle of 180° from each other and transmitting the alternating movement to the pistons 6, 7, respectively of the second and third cylinders 3,4.

The transmission input gearing 15 is driven by the cam shaft 12 without being locked thereto, the gearing being connected to the cam shaft by spiral grooves 16.

Similarly, situated in the same plane, the output gearing 17 driven by the input gearing 15 provides for the transmission of the small crankshaft 13 without being locked thereto, the output gearing 17 being also connected by spiral grooves 16 identical to those of the cam shaft 12.

Two guide pins 18 parallel to the cam shaft 12 and to the small crankshaft 13 are fixed in the head 19 and extend through bores in the walls of the clutch casing 11 so that the casing cannot shift transversely. These two pins are provided with a recoil spring 20 enabling the clutch to return to the idling position when it is disconnected from its control. A volumetric difference between the cylinders of the combustion chamber and of the reserve air chamber may be provided, for example, by reducing the volume of the latter to enable a higher compression ratio to be obtained when the engine is operated at partial output.

The gas pedal acts on the control linkage and on the hinged rod connected to the bearing plate of the clutch casing 11 and displaces the latter along the two guide pins 18 and the two shafts 12,13.

Complete axial displacement of the clutch casing 11 situated in the cylinder head 19 produces a double rotation of 90° in opposite directions between the cam shaft 12 and the small crankshaft 13, so that there is a total relative rotation of 180° between these two parts, with the result that the volumetric ratios of the second and third cylinders 3,4 are modified at the moment when the piston 2 of the first cylinder 1 is in the upper dead position at the end of its compression phase.

According to the invention, there are provided means for displacing the pistons 6,7 of the second and third cylinders 3,4 for the purpose of decarburizing the latter by a sweeping movement at least once between each combustion.

Means are also provided for driving the small crank shaft 13 either at the same speed as the main crank shaft 2′ or at half the speed of the latter.

There are also provided means for synchronizing the velocities of the three pistons, 2,6,7 and means for forming an idling combustion chamber in the third cylinder outside the sweeping zone of the corresponding piston, in which chamber are provided the injection means and means for igniting the mixture.

Stop control means are also provided for increasing or reducing the volume of the idling chamber as a function of the desired engine speed. Thus, in order to limit starting of the axial movement of the clutch 11 and ensure that the phase difference between rotation of the small crank 13 and the large crank 2′ does not exceed 180°, the setting of the cranks is synchronized so that the expansion chamber piston 2 mounted on the large crank shaft 2′ is situated in the upper dead position at the end of the compression phase when the piston 7 of the combustion chamber 4 and the piston 6 of the reserve air chamber 3, which pistons are mounted on the small crank 13, are situated, one in the upper dead point position and the other in the lower dead point position.

This position also coincides with the position of the bearing plate of the clutch (equipped with the control rod) when it is situated opposite the idling control screw (not shown in the drawing), which screw regulates the limit of starting of the axial excursion of the clutch. At that moment, the idling chamber will have its minimum volume and the reserve air chamber its maximum volume.

Another example of control is that the piston 7 of the combustion chamber 4, which piston is mounted on the small crank 13, does not reach the upper dead point position and the piston 6 of the reserve air chamber does not reach the lower dead point position when the large crank 2' is positioned as indicated above, the bearing plate of the clutch (equipped with the control rod) being also situated opposite the idling control screw. In that case, adjustment of the position of the idling screw will no longer be locked at the beginning of the limit of the axial excursion of the clutch and the idling chamber will have a larger volume than the minimum volume while the reserve air chamber will have a smaller volume than the maximum volume.

Other stopping control means are also provided to limit the axial end of course of the clutch so that the phase difference between the small crank 13 and large crank 2' will not exceed 180°. The setting of the latter relative to each other coincides so that the piston 2 of the expansion chamber 1, which piston is mounted on the large crank 2', is situated at the upper dead point position at the end of the compression phase when the piston 7 of the combustion chamber 4 and the piston 6 of the reserve air chamber 3, which pistons are mounted on the small crank 13, are situated, one in the lower dead point position and the other in the upper dead point position. This position also coincides with the position of the bearing plate of the clutch (which is now deprived of the control rod) when the plate is situated opposite the power control screw (not shown in the drawing), which screw regulates the limit of the axial excursion of the clutch. At that moment, the combustion chamber 4 will be at its maximum volume while the volume of the reserve air chamber 3 will be reduced to nil.

According to yet another control example, the piston 7 of the combustion chamber 4, mounted on the small crank 13, will not reach the lower dead point position and the piston 6 of the reserve air chamber 3, mounted on the same crank 13, will not reach the upper dead point position under conditions in which the large crank 2' is positioned as indicated above; the aforesaid bearing plate of the clutch (not equipped with control rod) being also situated opposite the power screw will no longer be locked at the end of the axial excursion limit of the clutch. The combustion chamber 4 will have a smaller volume than the maximum volume and the reserve air chamber 3 will have a minimum volume.

These controls enable the power of the engine to be limited by reducing the volume of the combustion chamber 4 and proportionally increasing the volume of the reserve air chamber 3.

The power controls also enable the quantities of combustion air and of fuel injection to be dosed and they determine the power, the temperature level of the engine, and the dilution with excess of reserve air required for the quality of the exhaust gas.

It is to be understood that one or other constructional modification within the scope of the attached claims may be applied to the embodiment described above and represented in the drawing without thereby departing from the scope of the invention.

Thus, the engine has been represented with a single cylinder 1 but an engine according to the invention may comprise several cylinders, each having a second cylinder 3 and a third cylinder 4 associated with it.

I claim:

1. A controlled ignition, mixed combustion cycle engine, the engine having a cylinder and a piston therein, comprising
    means forming two variable-volume chambers partitioned so as to be separated from each other, one of said chambers being a combustion chamber and the other of said chambers being an air reserve chamber, said chambers being associated with the cylinder and located adjacent an end of the cylinder corresponding to a top dead-center position of the piston in the cylinder,
    means for operatively communicating said chambers with each other,
    two pistons, one of said pistons respectively movably disposed in respective of said chambers,
    a small crankshaft,
    crank pins staggered by 180° from each other on said small crankshaft and operatively connected to said pistons of said chambers so as to transmit an alternating movement to said pistons of said chambers,
    a cam shaft operatively connected to said cylinder,
    said small crankshaft together with said cam shaft forms a kinematic chain, and
    a clutch having a clutch casing in said kinematic chain, and
    said clutch includes, in the clutch casing, a transmission input gearing driven by the cam shaft without being locked to said cam shaft but connected to said cam shaft by spiral shaft grooves, and disposed in a common plane with said transmission input gearing, an output gearing driven by said input gearing and being connected to said small crankshaft by spiral shaft grooves without being locked to said small crankshaft.

2. The engine according to claim 1, further comprising
    a cylinder head,
    said clutch further comprises two guide pins and a recoil spring on said guide pins, said guide pins are parallel to said cam shaft and said small crankshaft and are fixed in the cylinder head of the engine,
    said clutch casing being displaceable along said guide pins.

3. The engine according to claim 2, further comprising
    means for displacing said clutch casing by a gas pedal.

4. The engine according to claim 3, wherein
    said displacing means includes a control linkage and a pivotal rod which is integrally connected to a bearing plate of the clutch casing.

* * * * *